United States Patent
Otsuka et al.

(10) Patent No.: US 7,643,851 B2
(45) Date of Patent: Jan. 5, 2010

(54) WIRELESS COMMUNICATION APPARATUS, WIRELESS COMMUNICATION SYSTEM, AND CONTROL METHOD THEREOF

(75) Inventors: Mitsuru Otsuka, Kawasaki (JP); Akira Matsui, Ohta-ku (JP)

(73) Assignee: Canon Kabushiki Kaisha, Tokyo (JP)

( * ) Notice: Subject to any disclaimer, the term of this patent is extended or adjusted under 35 U.S.C. 154(b) by 645 days.

(21) Appl. No.: 11/549,325

(22) Filed: Oct. 13, 2006

(65) Prior Publication Data
US 2007/0100972 A1 May 3, 2007

(30) Foreign Application Priority Data
Oct. 28, 2005 (JP) ............... 2005-314843

(51) Int. Cl.
*H04M 1/00* (2006.01)
*H04B 1/38* (2006.01)

(52) U.S. Cl. .............. 455/560; 455/557; 455/41.2; 455/41.3; 455/550.1; 455/500; 455/502; 455/507; 455/510; 455/512; 455/513; 455/418; 455/420; 358/1.13; 358/1.14; 358/1.15

(58) Field of Classification Search ............ 455/550.1, 455/552.1, 553.1, 557, 560, 500, 502, 418–420, 455/41.2, 41.3, 507, 509–510, 512–513; 358/1.13–1.16, 1.18, 1.9
See application file for complete search history.

(56) References Cited

U.S. PATENT DOCUMENTS

| | | | |
|---|---|---|---|
| 5,768,359 A | 6/1998 | DiPierro, Jr. et al. | |
| 6,483,601 B1 * | 11/2002 | Yoneyama et al. | 358/1.15 |
| 6,807,907 B2 * | 10/2004 | Yamada | 101/484 |
| 7,292,363 B2 * | 11/2007 | Silverbrook et al. | 358/1.15 |
| 7,353,463 B2 * | 4/2008 | Stohrer et al. | 715/827 |
| 2002/0038370 A1 | 3/2002 | Demoto et al. | |

FOREIGN PATENT DOCUMENTS

| | | |
|---|---|---|
| CN | 1110849 A | 10/1995 |
| JP | 2004-193753 | 7/2004 |
| WO | 2004/098128 A | 11/2004 |

OTHER PUBLICATIONS

The above references were (except U.S. Appl. No. 5,768,359) cited in a Apr. 17, 2009 Chinese Office Action that issued in Chinese Patent Application No. 200610150136.6, a copy of which is enclosed with English Translation.

* cited by examiner

*Primary Examiner*—Tuan A Tran
(74) *Attorney, Agent, or Firm*—Cowan, Liebowitz & Latman, P.C.

(57) ABSTRACT

During wireless data communication with a digital camera, when a setting operation of communication parameters is designated by a communication setting button, the data communication with the camera is suspended, and the network is switched to a network for setting communication parameters for another camera. With this network, a setting operation of communication parameters for another camera is performed. Thereafter, the network for setting communication parameters is switched to the network for data communication with the original camera.

11 Claims, 8 Drawing Sheets

WIRELESS COMMUNICATION APPARATUS, WIRELESS COMMUNICATION SYSTEM, AND CONTROL METHOD THEREOF

BACKGROUND OF THE INVENTION

1. Field of the Invention

The present invention relates to a wireless communication apparatus, a wireless communication system, and a control method thereof.

2. Description of the Related Art

Conventionally a large number of methods of setting communication parameters for wireless communication have been considered. Japanese Patent Application Laid-Open (KOKAI) No. 2004-193753 discusses a method of setting a network identifier for connection to a wireless LAN network.

Meanwhile, in a communication system constituting a network for wireless communication between communication apparatuses, assume a case where data communication is performed between a first and second wireless communication apparatuses and a job using the data is executed by the first wireless communication apparatus. In this case, the network connection between the first and second wireless communication apparatuses is maintained until the job is completed because the job completion of the first wireless communication apparatus has to be notified to the second wireless communication apparatus. More specifically, when communication is performed between a printer and a digital camera, data used in a printing job is transmitted from the camera to the printer. When the printer executes the printing job based on the data and completes the printing job, the printer notifies the camera of the completion of printing. In this case, the network connection between the printer and the digital camera is maintained from the beginning of the printing job transmission from the camera to the printer to the notification of printing job completion by the camera.

In the above-described case, assume that the third wireless communication apparatus requests communication to the first wireless communication apparatus and attempts setting of communication parameters. In this case, the third wireless communication apparatus is forced to wait until the job is completed by the first wireless communication apparatus and the job completion is notified to the second wireless communication apparatus. Therefore, if the job requires a long time before completion, the setting operation of communication parameters started by the third wireless communication apparatus faces a timeout.

More specifically, while a printer is executing a printing job for printing data transmitted by a first digital camera, if a second digital camera attempts to set communication parameters in the printer, the second digital camera is forced to wait until the printing job is completed. If the printing job requires a long time to complete, the setting operation of communication parameters started by the second digital camera faces a timeout, causing a situation where the second digital camera cannot set communication parameters in the printer, thereby the second digital camera can not print using the printer.

SUMMARY OF THE INVENTION

The object of the present invention is to solve the problem of the above-described conventional art.

The feature of the present invention is to provide a wireless communication apparatus, a wireless communication system, and a control method thereof for performing data communication between the first and second wireless communication apparatuses, which enable the second wireless communication apparatus to set communication parameters while the first wireless communication apparatus is executing a job using the data received in the data communication.

According to the present invention, there is provided a wireless communication apparatus comprising:

a designation unit configured to designate a setting operation of communication parameters;

a first switching unit configured to, in a case where the setting operation is designated by the designation unit during wireless data communication between the wireless communication apparatus and a first wireless communication apparatus, suspend the data communication between the wireless communication apparatus and the first wireless communication apparatus and switch a network for setting of communication parameters for a second wireless communication apparatus other than the first wireless communication apparatus;

a communication parameter setting unit configured to set communication parameters for the second wireless communication apparatus via the network established by the first switching unit; and a second switching unit configured to switch a network for data communication between the wireless communication apparatus and the first wireless communication apparatus after the setting operation of communication parameters is completed for the second wireless communication apparatus.

Further, according to the present invention, there is provided a wireless communication system comprising:

a designation unit configured to, during wireless data communication between a first and second wireless communication apparatuses, designate a setting operation of communication parameters for a third wireless communication apparatus;

a first switching unit configured to, in a case where the setting operation is designated by the designation unit, suspend the data communication between the first and second wireless communication apparatuses and switch a network for setting communication parameters to communicate between the third wireless communication apparatus and one of the first and second wireless communication apparatuses;

a communication parameter setting unit adapted to perform communication parameter setting in the network established by the first switching unit; and a second switching unit configured to switch a network for data communication between the first and second wireless communication apparatuses after the setting operation of communication parameters is completed for the third wireless communication apparatus.

Further features of the present invention will become apparent from the following description of exemplary embodiments with reference to the attached drawings.

BRIEF DESCRIPTION OF THE DRAWINGS

The accompanying drawings, which are incorporated in and constitute a part of the specification, illustrate embodiments of the invention and, together with the description, serve to explain the principles of the invention.

DESCRIPTION OF THE EMBODIMENTS

A preferred embodiment of the present invention will now be described in detail with reference to the accompanying drawings. It should be noted that the embodiments below do not limit the present invention set forth in the claims and that not all of the combinations of features described in the embodiments are necessarily essential as means for attaining the objects of the invention.

First Embodiment

Figure 1:
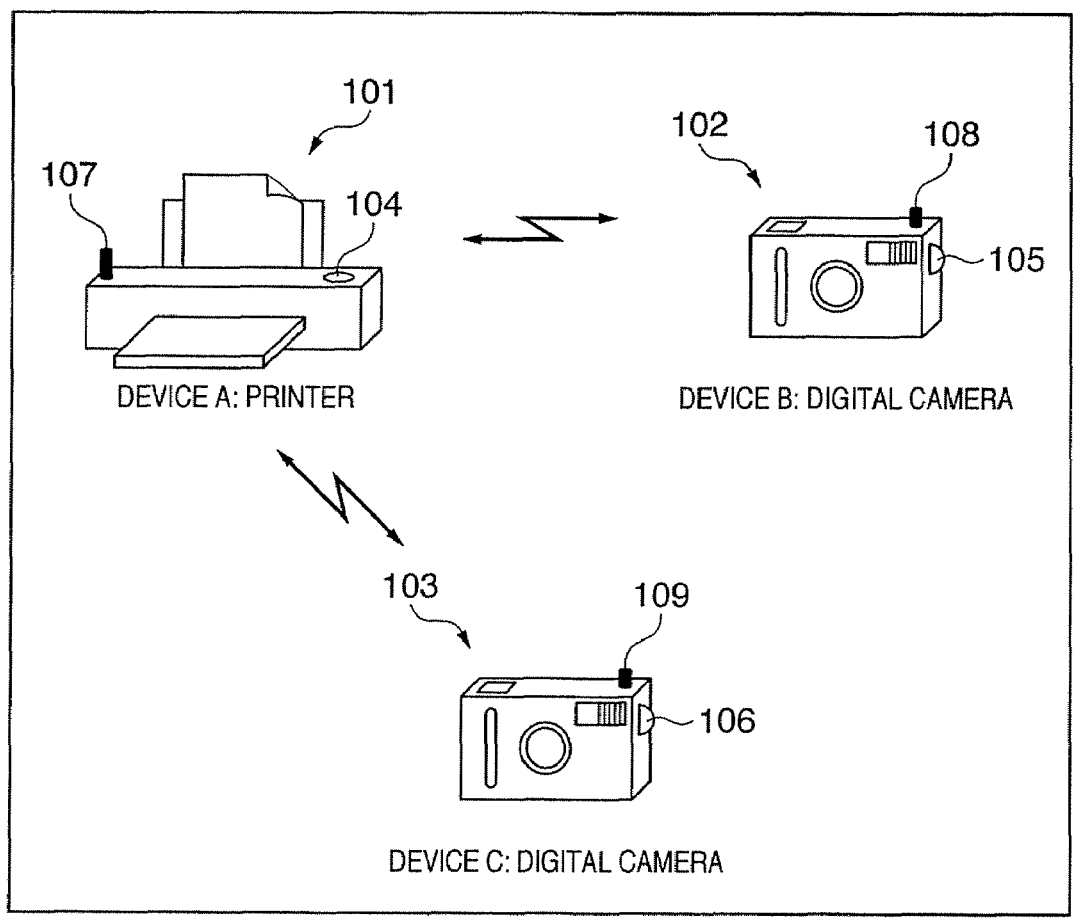
FIG. 1 depicts a view showing a configuration of a communication system according to a first embodiment of the present invention.

FIG. 1 depicts a view showing a configuration of a communication system according to the first embodiment of the present invention.

In FIG. 1, numerals 101, 102 and 103 denote wireless communication apparatuses according to the embodiment. In this embodiment, 101 denotes a printer (device A), 102 denotes a digital camera (device B), and 103 denotes a digital camera (device C). The printer 101 and the camera 102, or the printer 101 and the camera 103 constitute a network for performing direct communication between the respective devices. The printer 101 has a wireless communication function for transmitting or receiving data through an antenna 107. When a communication setting button 104 is depressed, an operation is started to connect the printer to the network. The digital camera 102 has a wireless communication function for transmitting or receiving data through an antenna 108. When a communication setting button 105 is depressed, an operation is started to connect the camera to the network. The digital camera 103 also has a wireless communication function for transmitting or receiving data through an antenna 109. When a communication setting button 106 is depressed, an operation is started to connect the camera to the network.

Figure 2:
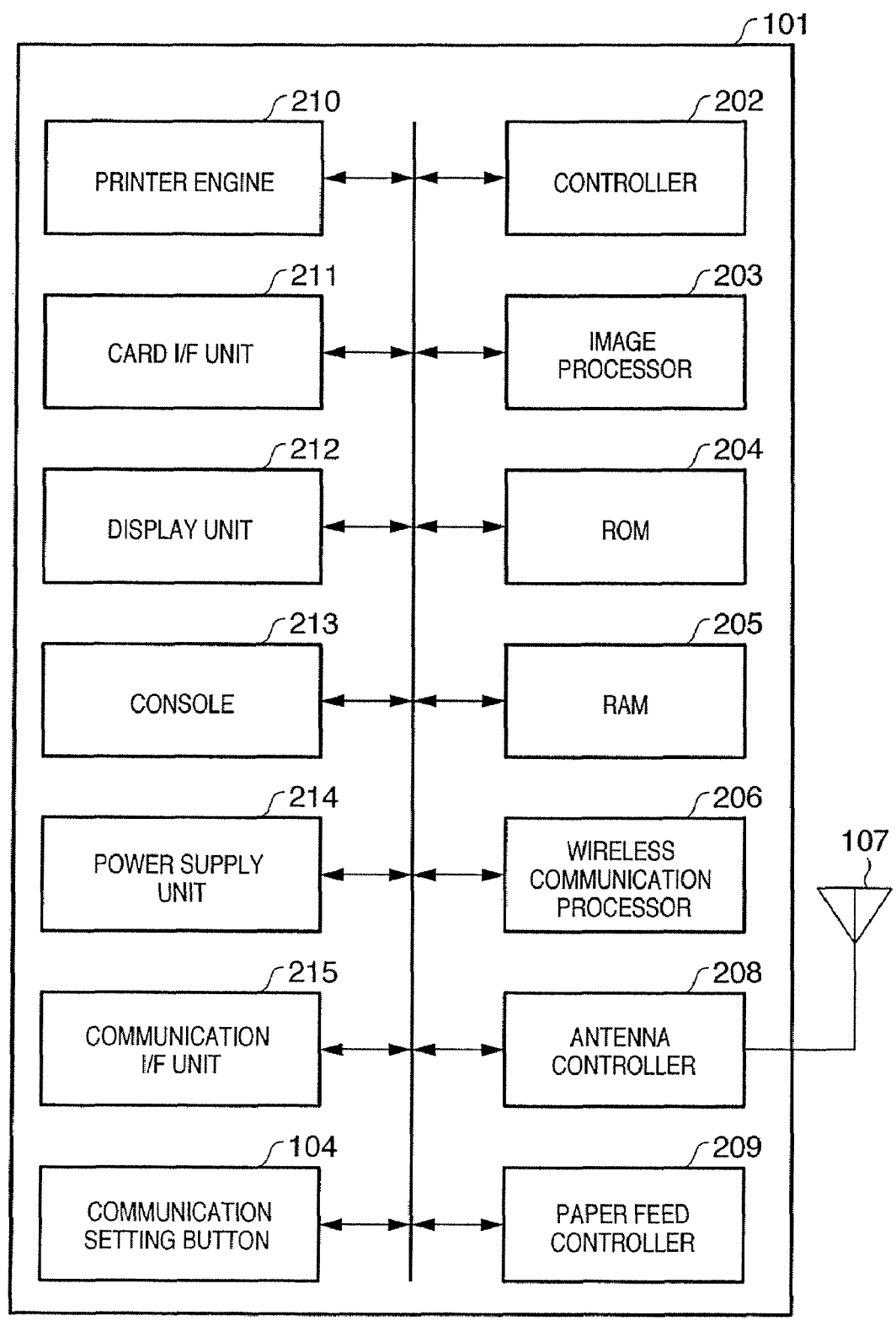
FIG. 2 is a block diagram showing a functional configuration of a printer according to an embodiment of the present invention.

FIG. 2 is a block diagram showing a functional configuration of the printer 101 according to the present embodiment.

In FIG. 2, a controller (CPU) 202 controls the entire operation of the printer 101. An image processor 203 processes image data received from a host unit or the like and converts it to printing data. ROM 204 stores a control command, i.e., a control program, which is executed by a CPU (not shown) of the controller 202. RAM 205 is used as a work area for storing various data when the CPU executes control processing. A wireless communication processor 206 performs communication control according to the wireless LAN 802.11 standard. An antenna controller 208 controls wireless data transmission and reception through the antenna 107. A paper feed controller 209 controls feeding and discharging of a printing paper (printing sheet). A printer engine 210 performs printing control of the printer 101 for executing printing by an inkjet method, an electrophotographic printing method and so on. A card interface unit 211 controls data writing and reading on a card storage medium where image data is stored. A display unit 212 displays an operation menu screen, a message to an operator, errors and so on. A console 213 comprises setting buttons for various print processing, the communication setting button 104 according to the present embodiment, and so on. A power supply unit 214 supplies electric power to respective units of the printer 101. A communication interface unit 215 is an interface for communication other than wireless communication, i.e., an interface for USB, IEEE 1394, and the like. The communication setting button 104, which is operated by a user, starts a network joining operation in order to realize direct wireless communication between devices.

Figure 3:
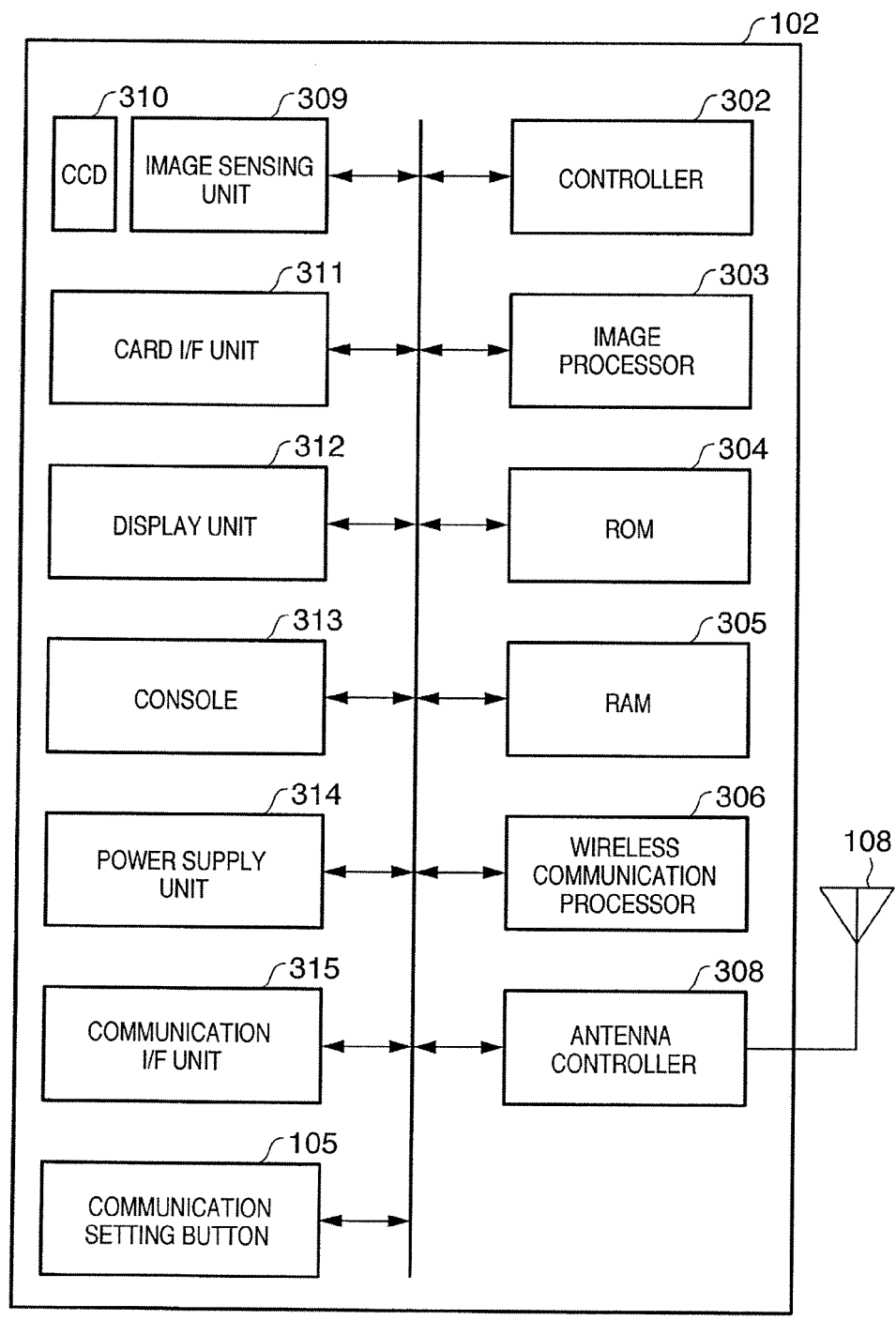
FIG. 3 is a block diagram showing a functional configuration of a digital camera according to the embodiment of the present invention.

FIG. 3 is a block diagram showing a functional configuration of the digital camera 102 according to the embodiment of the present invention.

In FIG. 3, a controller (CPU) 302 controls an operation of the digital camera 102. An image processor 303 executes image processing on the sensed image data. ROM 304 stores various data and programs executed by the CPU. RAM 305 temporarily stores various data and is also used as a work area when the CPU executes control processing. A wireless communication processor 306 performs communication control according to the wireless LAN 802.11 standard. An antenna controller 308 controls data transmission and reception through the antenna 108. An image sensing unit 309 captures pixel signals inputted from a CCD 310. A card interface unit 311 controls data writing and reading on a card storage medium where captured images, setting information and the like are stored. A display unit 312 displays an image subjected to image sensing, a sensed image, a UI screen, and the like. A console 313 comprises various switches and buttons used for image sensing, buttons used for respective settings on the UI screen, and the like. A power supply unit 314 supplies electric power to respective units of the digital camera 102. A communication interface unit 315 is an interface for communication other than wireless communication, i.e., an interface for USB, IEEE 1394, and the like. The communication setting button 105, which is operated by a user, starts a network joining operation in order to realize direct wireless communication between devices. Note, since the construction of the digital camera 103 is similar to that of the digital camera 102, a description thereof is omitted.

Figure 4:
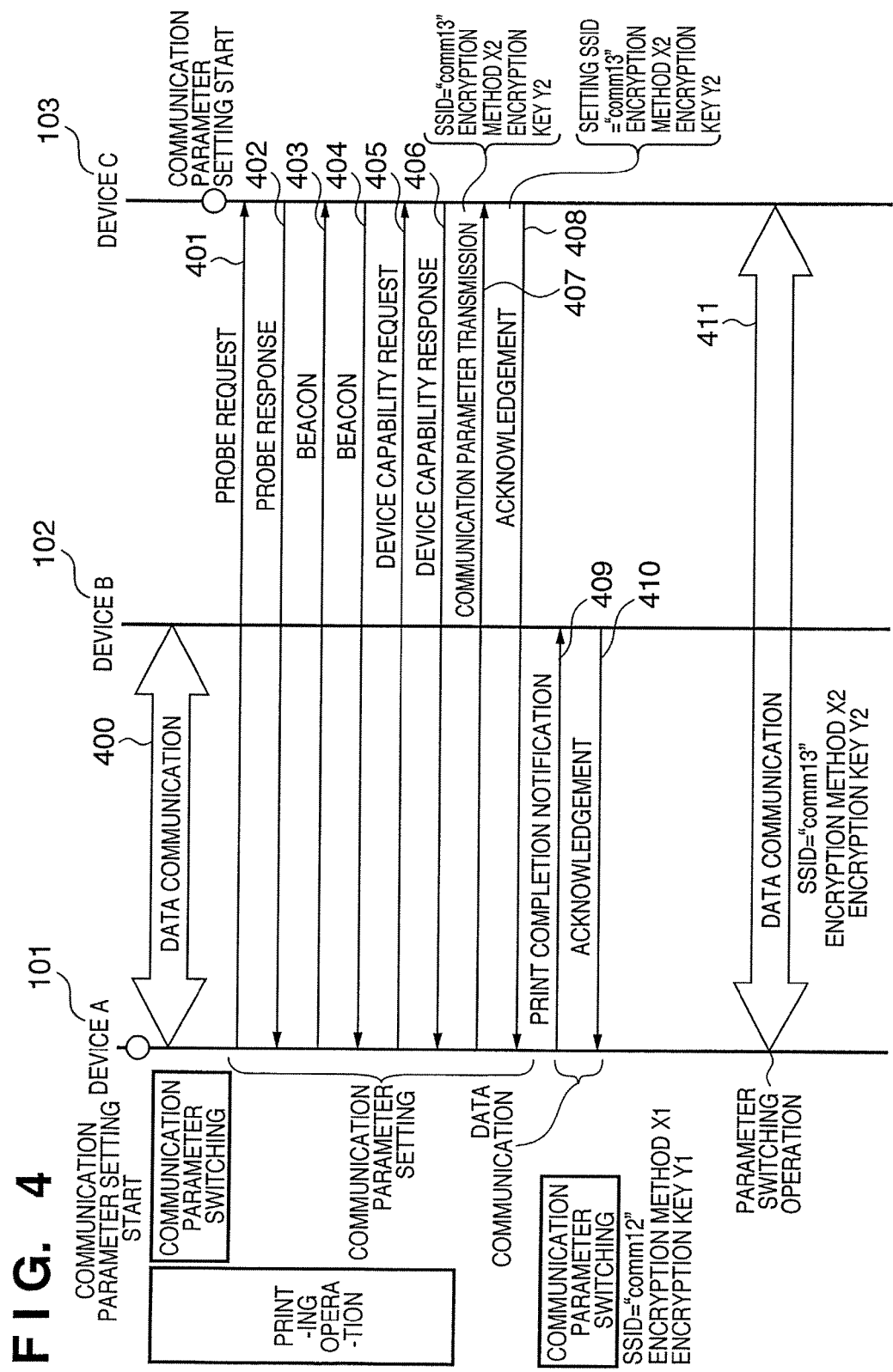
FIG. 4 depicts a view describing an operation sequence of setting communication parameters and data communication in the communication system according to the first embodiment of the present invention.

FIG. 4 depicts a view describing an operation sequence of setting communication parameters and data communication in the communication system according to the first embodiment of the present invention. Note that the communication parameters include a Service Set Identifier (SSID) serving as a network identifier, an encryption method, an encryption key, and the like. By commonly setting these communication parameters between devices, it becomes possible to execute wireless communication between devices.

Now in numeral 400, the devices A and B are executing data communication. These devices A and B are executing data communication with the following communication parameters: an SSID is set in "comm12"; an encryption method is set in X1; and an encryption key is set in Y1. As shown in FIG. 1, assume that the device A is the printer 101; the device B is the digital camera 102; and the device C is the digital camera 103. By this data communication 400, image data is transmitted from the digital camera 102 to the printer 101. The printer 101 which has received the image data starts a printing operation.

During the data communication (400), if the communication setting button 104 of the printer 101 and the communication setting button 106 of the digital camera 103 are depressed, network connection processing is started for setting communication parameters between the printer 101 and the digital camera 103. In this stage, the printer 101 waits for completion of the data communication between the printer 101 and the digital camera 102, and sets the communication parameters of a wireless LAN provided for setting communication parameters in the following manner: the SSID is set in "config"; the encryption method is set in X; and the encryption key is set in Y. Meanwhile, when the communication setting button 106 is depressed on the digital camera 103, communication parameters of the wireless LAN provided for setting communication parameters are set as follows: the SSID is set in "config"; the encryption method is set in X; and the encryption key is set in Y. In this stage, if the data communication between the printer 101 and the digital camera 102 has already ended, even if for instance the printer 101 is still continuing the printing operation of image data from the digital camera 102, network connection processing can be started for setting communication parameters between the printer 101 and the digital camera 103.

Upon setting communication parameters between the printer 101 and the digital camera 103, first the printer 101 transmits a probe request to the digital camera 103 (401). In response, a probe response is transmitted from the digital camera 103 to the printer 101 (402). Next, a beacon is transmitted from the printer 101 to the digital camera 103 (403). Next, a beacon is transmitted also from the digital camera 103 to the printer 101 (404).

Thereafter, a device capability request is transmitted from the printer 101 to the digital camera 103 (405). In response, the digital camera 103 returns, as a device capability response, device capability information including a MAC address of the device C, the type of device C, and a corresponding wireless encryption method (406). The printer 101, which has received the device capability information of the digital camera 103, generates communication parameters to be used in the network connection for data communication between the printer 101 and the digital camera 103. Then, the communication parameters are transmitted to the digital camera 103 (407).

Numeral 407 in FIG. 4 shows an example in which the SSID is designated to "comm13", the encryption method is designated to X2, and the encryption key is designated to Y2 as the wireless LAN communication parameters. The digital camera 103 which has received the communication parameters returns an acknowledgement to the printer 101 (408). After the communication parameters for wireless communication network connection are transmitted and received between the printer 101 and the digital camera 103, the communication parameter setting network between the printer 101 and the digital camera 103 ends. When the communication parameter setting network ends, the digital camera 103 sets the communication parameters (the SSID "comm13", the encryption method X2, and the encryption key Y2) designated by the printer 101.

On the other hand, when the communication parameter setting network ends, the printer 101 switches the communication parameters to those provided for the data communication network between the printer 101 and the digital camera 102 (the SSID "comm12", the encryption method X1, and the encryption key Y1) in order to notify the digital camera 102 of the print completion when the printing operation has completed. When the printer 101 completes the printing operation of the image data received from the digital camera 102, the printer 101 transmits a print completion notification to the digital camera 102 (409). The digital camera 102, which has received the print completion notification, returns an acknowledgement to the printer 101 (410). In this manner, the operation sequence from setting the communication parameters to the data communication executed between the printer 101 and the digital camera 102 ends.

When the user performs operation for data communication between the printer 101 and the digital camera 103, the printer 101 switches the communication parameters in the following manner: the SSID is switched to "comm13"; the encryption method is switched to X2; and the encryption key is switched to Y2 (411). As a result, the printer 101 and the digital camera 103 can start data communication.

As described above, according to the first embodiment, even if the printer is printing image data transmitted from the camera 102, the printer 101 is able to set communication parameters for executing wireless communication between the printer 101 and the other camera 103.

Figure 5:
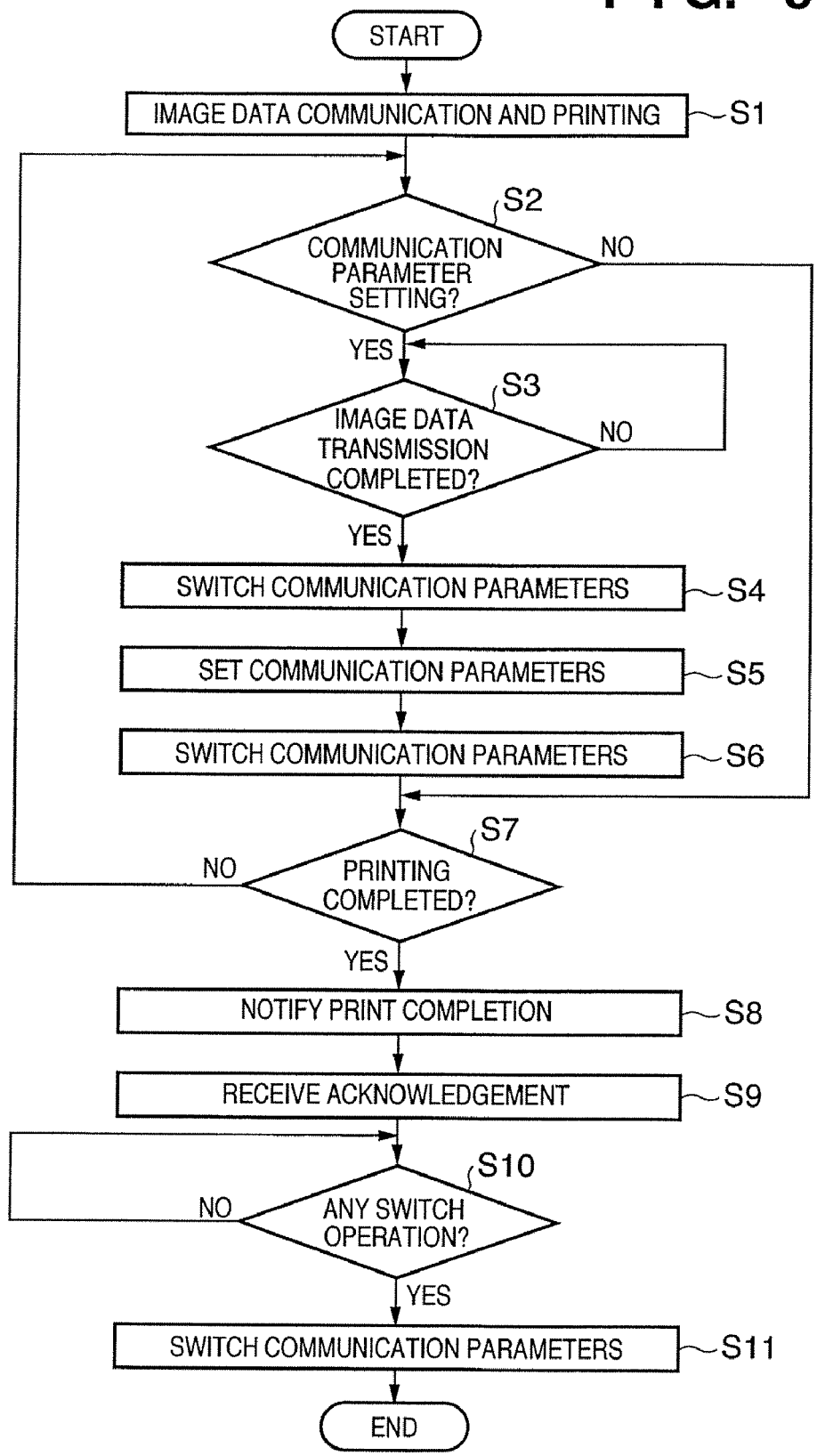
FIG. 5 is a flowchart describing an operation of the printer according to the first embodiment of the present invention.

FIG. 5 is a flowchart describing an operation of the printer 101 according to the first embodiment of the present invention. Note that the program that executes this processing is stored in the ROM 204.

In step S1, image data communication is performed between the printer 101 and the digital camera 102 (400 in FIG. 4). Image data received by this image data communication is printed. In step S2, while image data printing is performed, it is determined whether or not the communication setting button 104 of the printer 101 is depressed to input a designation of setting communication parameters. If the designation of setting communication parameters is inputted, the control proceeds to step S3. If the designation of setting communication parameters is not inputted, the control proceeds to step S7. The print processing continues until it is completed.

In step S3, it is determined whether or not image data transmission from the digital camera 102 is completed. If image data transmission is completed, the control proceeds to step S4. If image data transmission is not completed, the image data reception continues in step S3.

In step S4, communication parameters are switched for setting communication parameters to communicate with another device besides the digital camera 102. In step S5, setting of communication parameters is performed between the printer and a device (the digital camera 103 in the example in FIG. 4) that is a new communication target. This corresponds to the series of setting sequence of communication parameters, for example, described in numerals 401 to 408 in FIG. 4. When the communication parameters are finally transmitted and the acknowledgement response is received, the control proceeds to step S6 where the printer switches the communication parameters to those used in image data communication in step S1. This corresponds to the communication parameter switching (SSID "comm12", encryption method X2, and encryption key Y2) in the example in FIG. 4.

In step S7, it is determined whether or not the printing operation started in step S1 is completed. If the printing operation is completed, the control proceeds to step S8 to notify the digital camera 102 of print completion (409) in accordance with the communication parameters switched in step S6. This corresponds to the sequence 409 in FIG. 4. Meanwhile, if the printing operation is not completed, the control proceeds to step S2 to continue printing.

In step S9, the printer 101 receives an acknowledgement message from the digital camera 102 in response to the print completion notification transmitted in step S8. This corresponds to the sequence 410 in the example in FIG. 4. In step S10, when the printer detects a user's communication parameter switching operation, the printer switches the communication parameters in step S11 to those set for the digital camera 103 (411 in FIG. 4).

Figure 6:
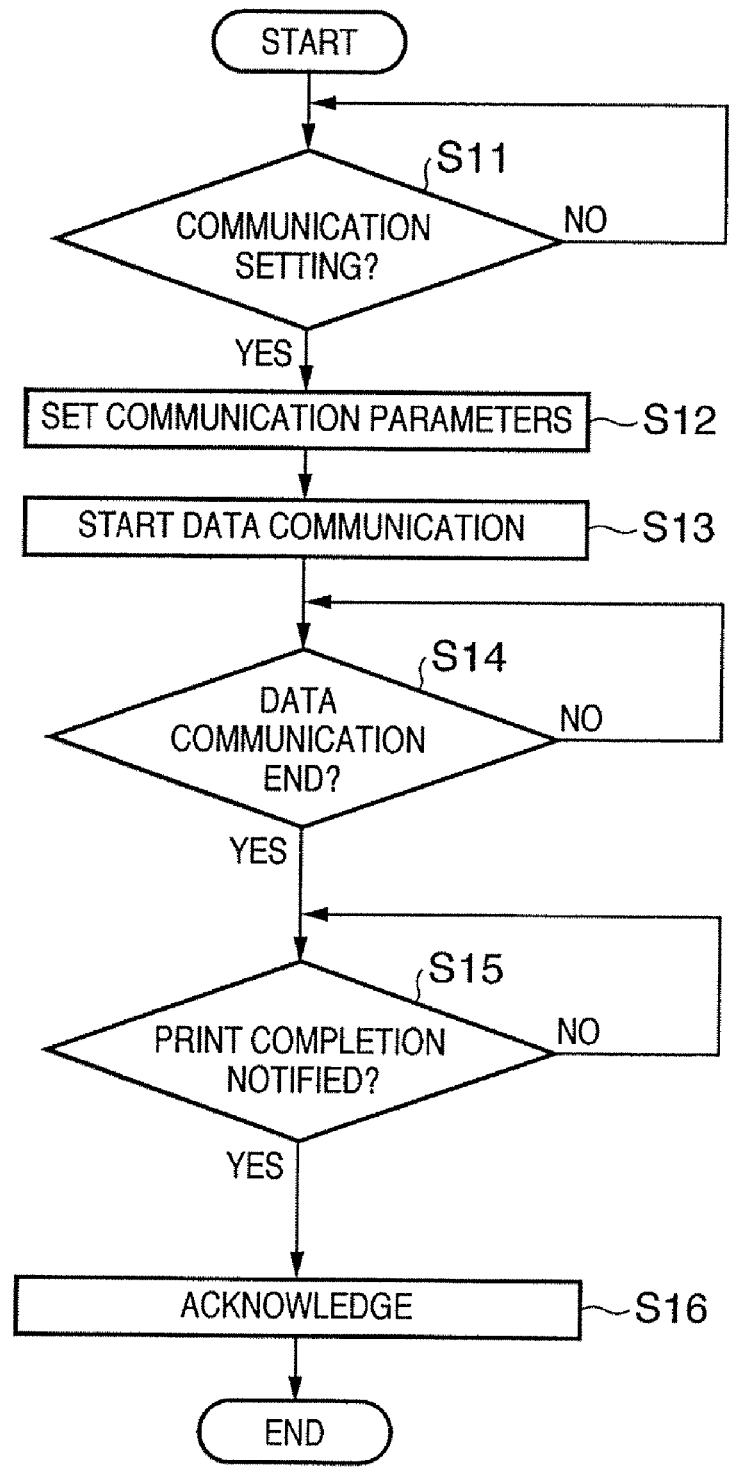
FIG. 6 is a flowchart describing an operation of the digital camera according to the first embodiment of the present invention.

FIG. 6 is a flowchart describing an operation of the digital camera 102 (device B) according to the first embodiment of the present invention. Note that the program that executes this processing is stored in the ROM 304.

In step S11, it is determined whether or not the setting operation of communication parameters is started. This is determined by whether or not the communication setting button 105 is depressed on the digital camera 102. When the communication setting button 105 is depressed, the control proceeds to step S12 where communication parameters are set between the digital camera 102 and the printer 101. In step S13, the communication parameters are switched to those set in step S12, and data communication is started (400 in FIG. 4). In step S14, it is determined whether or not image data transmission is completed and the data communication is to be ended. When it is determined that the data communication is to be ended, the control proceeds to step S15, and it is determined whether or not completion of the printing operation started by the printer 101 is notified by a print completion notification through the data communication started in step S13. When the print completion notification is received after the printing operation completed in the printer 101, the control proceeds to step S16, and an acknowledgement message to the print completion notification received in step S15 is transmitted to the printer 101 (410).

While the devices A and B are performing wireless communication, communication parameters can be set between either the devices A or B and another device C. By virtue of this, immediately after the communication between the devices A and B ends, wireless communication can be executed between either the devices A or B and the another device C.

Note that the printer 101 may be configured to switch the communication parameters for the digital camera 103 back to the communication parameters for the digital camera 102 according to user's operation. This enables the printer 101 to perform communication with both digital cameras 102 and 103 at user's desired timing, thus improving the usability of the printer 101.

Second Embodiment

Next, a communication system according to the second embodiment of the present invention is described. The system configuration of the second embodiment is identical to that of the communication system (FIG. 1) according to the above-described first embodiment. Also, the configuration of respective devices according to the second embodiment is identical to that of the first embodiment (FIGS. 2 and 3). Assume that the first half of the operation sequence of setting the communication parameters and data communication in the communication system according to the second embodiment is identical to the operation sequence (FIG. 4) of the first embodiment.

Figure 7:
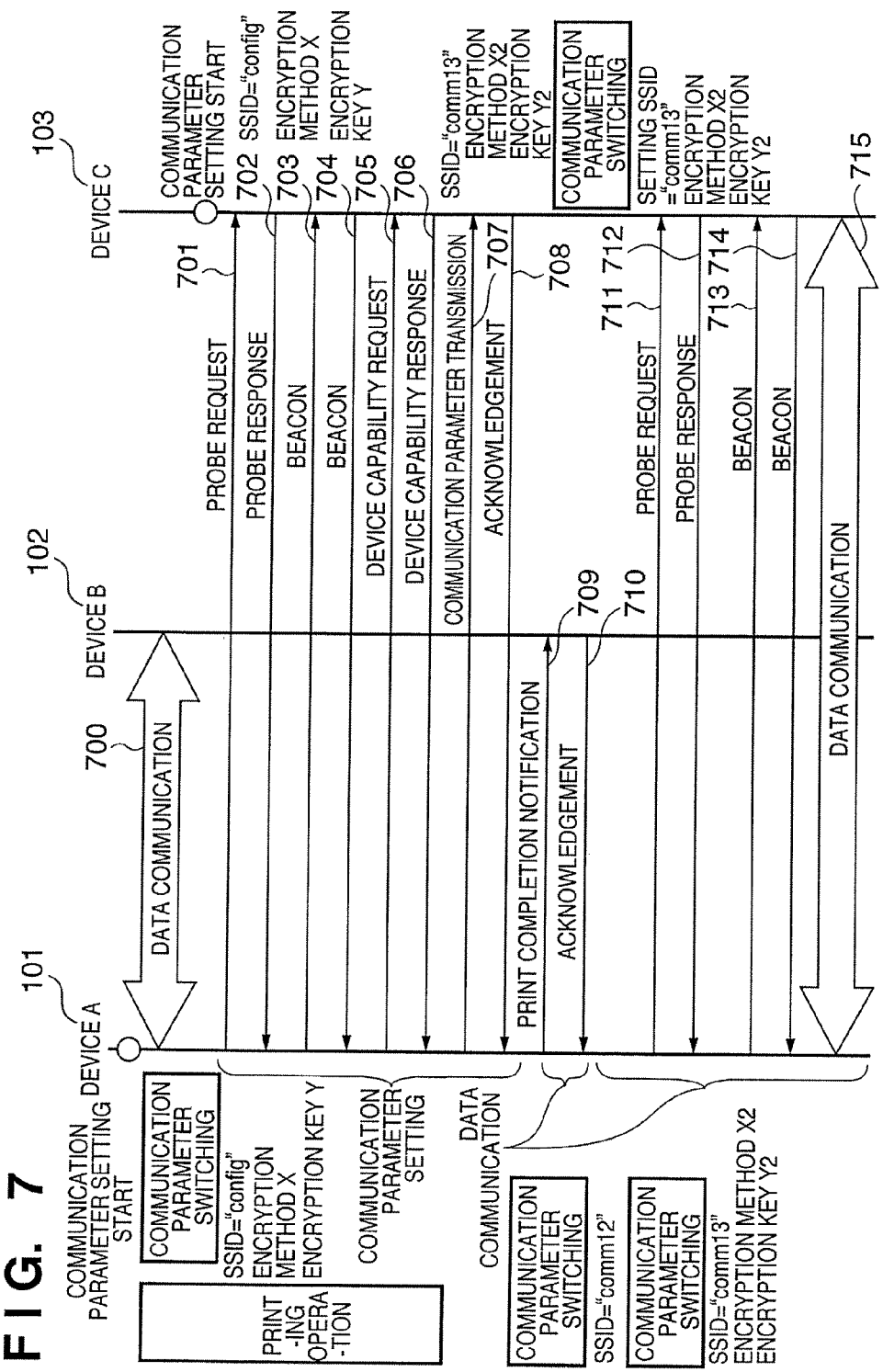
FIG. 7 depicts a view describing an operation sequence of setting communication parameters and data communication in a communication system according to a second embodiment of the present invention.

FIG. 7 depicts a view showing an operation sequence of communication parameter setting and data communication in the communication system according to the second embodiment of the present invention.

In numeral 700, the printer 101 (device A) and the digital camera 102 (device B) are executing data communication. In this stage, the printer 101 and the digital camera 102 are executing communication with the following communication parameters: the SSID is set in "comm12"; the encryption method is set in X1; and the encryption key is set in Y1. By this data communication, image data is transmitted from the digital camera 102 to the printer 101. The printer 101 which has received the image data starts a printing operation.

During the data communication (700), if the communication setting button 104 of the printer 101 and the communication setting button 106 of the digital camera 103 are depressed, network connection processing is started for setting communication parameters between the printer 101 and the digital camera 103. More specifically, the printer 101 waits for completion of the data communication between the printer 101 and the digital camera 102, and sets the communication parameters of a LAN provided for communication parameter setting in the following manner: the SSID is set in "config"; the encryption method is set in X; and the encryption key is set in Y. Meanwhile, when the communication setting button 106 is depressed on the digital camera 103, communication parameters of the LAN provided for setting communication parameters are set as follows: the SSID is set in "config"; the encryption method is set in X; and the encryption key is set in Y. In this stage, if the data communication between the printer 101 and the digital camera 102 has already ended, even if for instance the printer 101 is still continuing the printing operation of the image data received from the digital camera 102, the network connection processing can be started for setting communication parameters between the printer 101 and the digital camera 103.

Next, the printer 101 transmits a probe request to the digital camera 103 (701). In response, a probe response is transmitted from the digital camera 103 to the printer 101 (702). Next, a beacon is transmitted from the printer 101 to the digital camera 103 (703). A beacon is transmitted also from the digital camera 103 to the printer 101 (704).

Next, a device capability request is transmitted from the printer 101 to the digital camera 103 (705). In response, the digital camera 103 returns, as a device capability response, device capability information including a MAC address of the device C (the digital camera 103), the type of device, and a corresponding wireless encryption method (706).

The printer 101, which has received the device capability information of the digital camera 103, generates communication parameters to be used in the network connection for data communication between the printer 101 and the digital camera 103. Then, the communication parameters are transmitted to the digital camera 103 (707). FIG. 7 shows an example in which the SSID is designated to "comm13", the encryption method is designated to X2, and the encryption key is designated to Y2 as wireless LAN communication parameters. The digital camera 103 which has received the communication parameters returns an acknowledgement to the printer 101 (708).

After the communication parameters for data communication network connection are transmitted and received between the printer 101 and the digital camera 103, the communication parameter setting network between the printer 101 and the digital camera 103 ends. When the communication parameter setting network ends, the digital camera 103 sets the communication parameters (the SSID "comm13", the encryption method X2, and the encryption key Y2) designated by the printer 101.

The printer 101 switches the communication parameters to those provided for data communication network between the printer 101 and the digital camera 102 (the SSID "comm12", the encryption method X1, and the encryption key Y1). When the printer 101 completes the printing operation of the image data received from the digital camera 102, the printer 101 transmits a print completion notification to the digital camera 102 (709). The digital camera 102, which has received the print completion notification, returns an acknowledgement to the printer 101 (710).

In the above-described manner, the operation sequence from setting of the communication parameters to the data communication executed between the printer 101 and the digital camera 102 ends. The processing described so far is similar to the processing 400 to 410 in FIG. 4 described in the first embodiment.

After the printer 101 receives an acknowledgement from the digital camera 102 (710), the printer 101 switches the communication parameters to those provided for data communication network between the printer 101 and the digital camera 103. Then, the printer 101 transmits a probe request to the digital camera 103 (711). In response, a probe response is transmitted from the digital camera 103 to the printer 101 (712). Next, a beacon is transmitted from the printer 101 to the digital camera 103. In response, a beacon is transmitted from the digital camera 103 to the printer 101 (714). Thereafter, data communication is performed between the printer 101 and the digital camera 103 (715).

Figure 8:
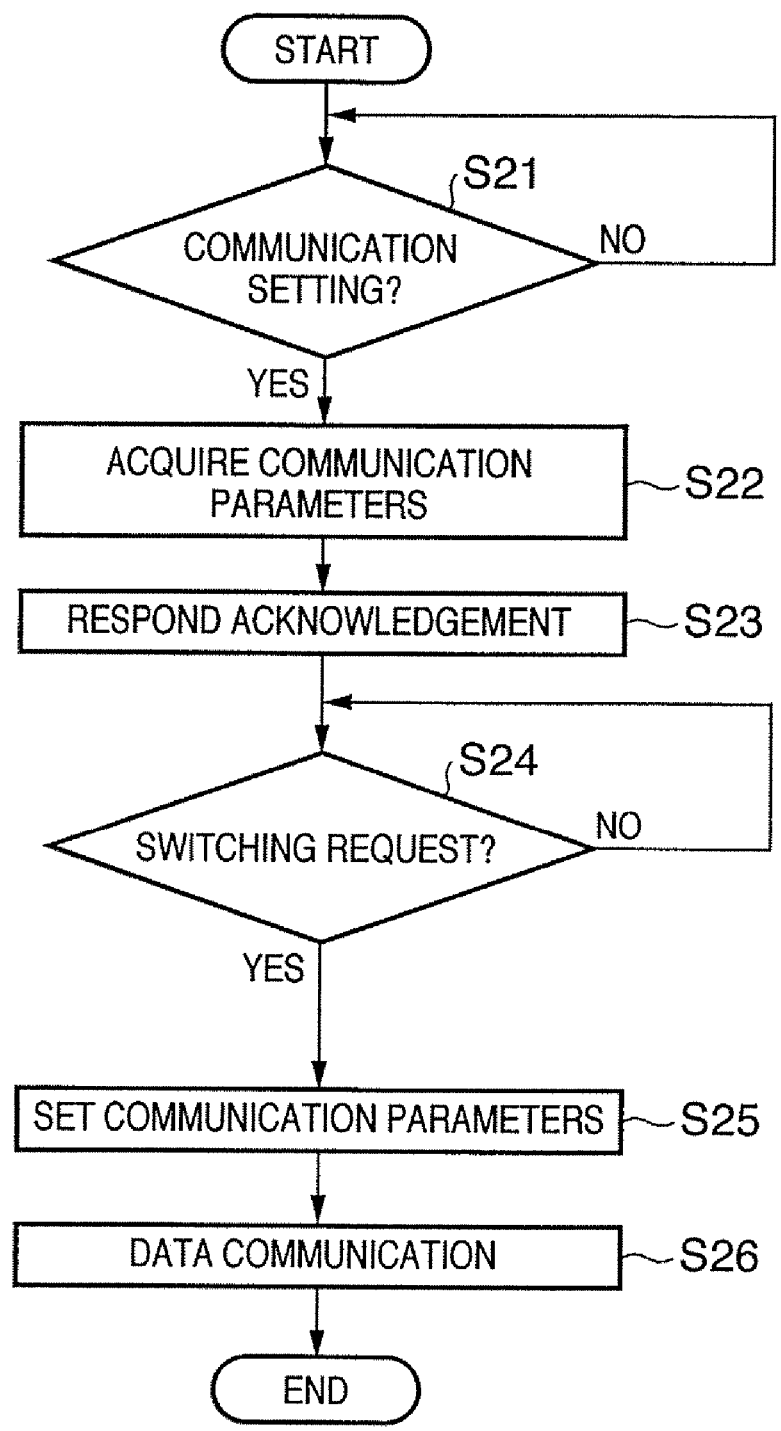
FIG. 8 is a flowchart describing processing of another digital camera according to the embodiment.

FIG. 8 is a flowchart describing processing of the other digital camera 103 according to the first and second embodiments. Note that the program that executes this processing is stored in the ROM 304.

In step S21, it is determined whether or not the setting of the communication parameters is started. This is determined by whether or not the communication setting button 106 is depressed on the digital camera 103. When the communication setting button 106 of the digital camera 103 is depressed, the control proceeds to step S22 where communication parameters are acquired from the printer 101. This corresponds to the processing 401 to 407 in FIG. 4 and processing 701 to 707 in FIG. 7. In step S23, an acknowledgement message is transmitted to the printer 101 (408 in FIG. 4, 708 in FIG. 7) from the digital camera 103. In step S24, it is determined whether or not the digital camera 103 is to receive a communication parameter switching request (711 in FIG. 7) from the printer 101. Note that since the communication parameters are switched self-reliantly in the first embodiment, step S24 is omitted. When the communication parameter switching request is received, the control proceeds to step S25 and the communication parameters are switched to those acquired in step S22. Then, data communication is started with the switched communication parameters (715 in FIG. 7).

As described above, the present embodiment achieves the following effect. More specifically, while the first and second wireless communication apparatuses are performing data communication and the first wireless communication apparatus is executing a job using the data received by the data communication, the setting operation of communication parameters can be performed for the third wireless communication apparatus.

In particular, the embodiment achieves the following effect. While a printer is executing a printing operation based on image data received from a digital camera, it is possible to perform setting of communication parameters for another digital camera. When the printing operation ends, the printer is able to start connection for data communication with the another digital camera.

Other Embodiment

The present invention can also be achieved by directly or remotely providing a software program realizing the functions of the above-described embodiments to a computer system or apparatus, reading the program by a computer of the system or apparatus, and executing the program. In the above-described embodiments, the program corresponds to the flowcharts. In this case, as long as it functions as a program, the form of embodiment is not limited to a program. Therefore, the program codes themselves which are installed in a computer to have the computer realize the functions of the present invention also constitute the invention. In other words, the claims of the present invention include the computer program itself that realizes the functions of the present invention. In this case, as long as it functions as a program, the form of program may be of object codes, a program executed by an interpreter, script data supplied to an OS, or the like.

Various recording media can be used for supplying the program. For instance, a floppy (registered trademark) disk, a hard disk, an optical disk, a magneto-optical disk, MO, CD-ROM, CD-R, CD-RW, a magnetic tape, a non-volatile memory card, ROM, DVD (DVD-ROM, DVD-R) and the like can be used.

As another program supplying method, a home page on the Internet is accessed using a browser of a client computer, and a program may be downloaded from the homepage to a recording medium such as a hard disk. In this case, the downloaded program may be a computer program itself according to the present invention, or a compressed file including an automatic installation function. The program codes constituting the program according to the present invention may be divided into plural files, and each of the plural files may be downloaded from different home pages. In other words, the claims of the present invention also include a WWW server which allows plural users to download the program file that realizes the functions of the present invention using a computer.

Furthermore, the program according to the present invention may be encrypted and stored in a storage medium, e.g., CD-ROM, for user distribution. In this case, a user who satisfies a predetermined condition is allowed to download decryption key data from a homepage on the Internet and execute the encrypted program using the key data to install the program in a computer.

Still further, the present invention can also be achieved by an embodiment other than the above-described embodiment where aforesaid functions of the embodiments are realized by executing the program read by a computer. For instance, the functions according to the above embodiments can be realized by an OS (operating system) or the like working on a computer that performs part or the entire processes in accordance with designations of the program.

Furthermore, the program read from the recording medium may be written in a function expansion card which is inserted into the computer or in a memory provided in a function expansion unit which is connected to the computer. In this case, after the program is written in the function expansion card or unit, a CPU or the like contained in the function expansion card or unit performs part or the entire processes in accordance with designations of the program, thereby realizing the functions according to the above-described embodiments.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2005-314843 filed on Oct. 28, 2005, which is hereby incorporated by reference herein in its entirety.

What is claimed is:

1. A wireless communication apparatus comprising:
a designation unit configured to designate a setting operation of communication parameters;
a first switching unit configured to, in a case where the setting operation is designated by said designation unit during wireless data communication between said wireless communication apparatus and a first wireless communication apparatus, suspend the data communication between said wireless communication apparatus and the first wireless communication apparatus and switch a network for setting of communication parameters for a second wireless communication apparatus other than the first wireless communication apparatus;
a communication parameter setting unit configured to set communication parameters for the second wireless communication apparatus via the network established by said first switching unit; and
a second switching unit configured to switch a network for data communication between said wireless communication apparatus and the first wireless communication apparatus after the setting operation of communication parameters is completed for the second wireless communication apparatus.

2. The wireless communication apparatus according to claim 1, further comprising a communication unit configured to, after the network is switched by said second switching unit and a job for the first wireless communication apparatus is completed, execute wireless data communication between said wireless communication apparatus and the second wireless communication apparatus based on the communication parameters set by said communication parameter setting unit.

3. The wireless communication apparatus according to claim 2, wherein said communication unit performs communication by switching communication parameters to the communication parameters set by said communication parameter setting unit in accordance with a user's operation.

4. The wireless communication apparatus according to claim 2, wherein said communication unit performs communication by automatically switching communication parameters to the communication parameters set by said communication parameter setting unit in response to the completion of the job for the first wireless communication apparatus.

5. A wireless communication system comprising:
a designation unit configured to, during wireless data communication between a first and second wireless communication apparatuses, designate a setting operation of communication parameters for a third wireless communication apparatus;
a first switching unit configured to, in a case where the setting operation is designated by said designation unit, suspend the data communication between the first and second wireless communication apparatuses and switch a network for setting communication parameters to communicate between the third wireless communication apparatus and one of the first and second wireless communication apparatuses;
a communication parameter setting unit adapted to perform communication parameter setting in the network established by said first switching unit; and
a second switching unit configured to switch a network for data communication between the first and second wireless communication apparatuses after the setting operation of communication parameters is completed for the third wireless communication apparatus.

6. The wireless communication system according to claim 5, further comprising a communication unit configured to, after the network is switched by said second switching unit and a job between the first and second wireless communication apparatuses is completed, execute wireless data communication between the third wireless communication apparatus and one of the first and second wireless communication apparatus based on the communication parameters set by said communication parameter setting unit.

7. A wireless communication apparatus comprising:
a designation unit configured to designate a setting operation of communication parameters;
a first switching unit configured to, in a case where the setting operation is designated by said designation unit during wireless data communication between said wireless communication apparatus and a first wireless communication apparatus, suspend the data communication between the wireless communication apparatus and the first wireless communication apparatus and switch a network for setting communication parameters for a second wireless communication apparatus;
a communication parameter setting unit configured to set communication parameters for the second wireless communication apparatus via the network established by said first switching unit; and
a continuation unit configured to continue data processing based on data communication between said wireless communication apparatus and the first wireless communication apparatus even after the network is switched by said first switching unit.

8. The wireless communication apparatus according to claim 7, further comprising a second switching unit configured to switch a network for data communication between said wireless communication apparatus and the first wireless communication apparatus after the setting operation of communication parameters is completed for the second wireless communication apparatus.

9. The wireless communication apparatus according to claim 8, wherein said continuation unit continues output processing of data received from the first wireless communication apparatus,
further comprising a notification unit configured to notify the first wireless communication apparatus of the output processing result through the network switched by said second switching unit.

10. A control method of a wireless communication apparatus comprising:
a designation step of designating a setting operation of communication parameters;
a first switching step of, in a case where the setting operation is designated in said designation step during wireless data communication between said wireless communication apparatus and a first wireless communication apparatus, suspending the data communication between said wireless communication apparatus and the first wireless communication apparatus and switching a network for setting communication parameters for a second wireless communication apparatus;
a communication parameter setting step of setting communication parameters for the second wireless communication apparatus via the network established in said first switching step; and
a second switching step of switching a network for data communication between said wireless communication apparatus and the first wireless communication apparatus, after the setting operation of communication parameters is completed for the second wireless communication apparatus.

11. A control method of a wireless communication apparatus, comprising:
- a designation step of designating a setting operation of communication parameters;
- a first switching step of, in a case where the setting operation is designated in said designation step during wireless data communication between said wireless communication apparatus and a first wireless communication apparatus, suspending the data communication between the wireless communication apparatus and the first wireless communication apparatus and switching a network for setting communication parameters for a second wireless communication apparatus;
- a communication parameter setting step of setting performing communication parameters for the second wireless communication apparatus via the network established in said first switching step; and
- a continuation step of continuing data processing based on data communication between said wireless communication apparatus and the first wireless communication apparatus even after the network is switched in said first switching step.

* * * * *